United States Patent
Jeong et al.

(10) Patent No.: US 12,474,475 B2
(45) Date of Patent: Nov. 18, 2025

(54) METHOD, APPARATUS, AND COMPUTER PROGRAM FOR GENERATING INPUT FEATURE MAP OF ARTIFICIAL INTELLIGENCE MODEL TO DETECT OBJECT BASED ON LiDAR

(71) Applicant: RideFlux Inc., Jeju-si (KR)

(72) Inventors: Hawook Jeong, Jeju-si (KR); Hee Kon Kim, Jeju-si (KR); Jung Hee Park, Seoul (KR)

(73) Assignee: RideFlux Inc., Jeju-si (KR)

( * ) Notice: Subject to any disclaimer, the term of this patent is extended or adjusted under 35 U.S.C. 154(b) by 331 days.

(21) Appl. No.: 17/929,717

(22) Filed: Sep. 5, 2022

(65) Prior Publication Data

US 2023/0072682 A1 Mar. 9, 2023

(30) Foreign Application Priority Data

Sep. 6, 2021 (KR) .................. 10-2021-0118205

(51) Int. Cl.
*G01S 17/89* (2020.01)
*G01S 17/931* (2020.01)

(52) U.S. Cl.
CPC ............ *G01S 17/89* (2013.01); *G01S 17/931* (2020.01)

(58) Field of Classification Search
CPC ...... G01S 17/89; G01S 17/931; G01S 7/4802; G01S 7/4808; G01S 17/08
See application file for complete search history.

(56) References Cited

U.S. PATENT DOCUMENTS

| 2017/0369051 A1* | 12/2017 | Sakai ................... G06V 10/255 |
| 2020/0047337 A1* | 2/2020 | Williams ............... B25J 9/1676 |
| 2020/0150235 A1 | 5/2020 | Beijbom et al. |

(Continued)

FOREIGN PATENT DOCUMENTS

| CN | 107092020 A * | 8/2017 | ............. G01S 17/86 |
| JP | 2017-203766 A | 11/2017 | |

OTHER PUBLICATIONS

Anjul Tyagi; "PointPillars—3D point clouds bounding box detection and tracking"; Jul. 19, 2020; 8 pages; https://becominghuman.ai/Jul. 19, 2020.

(Continued)

*Primary Examiner* — Tung S Lau
(74) *Attorney, Agent, or Firm* — Studebaker Brackett PLLC

(57) ABSTRACT

Provided are a method, an apparatus, and a computer program for generating an input feature map of an artificial intelligence model to detect an object based on light detection and ranging (LiDAR). A method of generating an input feature map of an artificial intelligence model to detect an object based on LiDAR, which is to be performed by a computing apparatus, may include collecting LiDAR sensor data in the form of a three-dimensional point cloud for a predetermined area, generating one or more first feature maps by processing the collected LiDAR sensor data based on one or more predefined indicators, and generating the input feature map of the artificial intelligence model by combining, as an independent channel, each of the one or more generated first feature maps with one of the second feature maps previously generated based on a distance and an angle.

7 Claims, 8 Drawing Sheets

(56) References Cited

U.S. PATENT DOCUMENTS

| | | | |
|---|---|---|---|
| 2021/0005085 A1* | 1/2021 | Cheng | G08G 1/166 |
| 2021/0063578 A1* | 3/2021 | Wekel | G01S 17/894 |
| 2021/0146952 A1 | 5/2021 | Vora et al. | |
| 2021/0150230 A1* | 5/2021 | Smolyanskiy | G06V 10/82 |

OTHER PUBLICATIONS

Alex H. Lang et al.; "PointPillars: Fast Encoders for Object Detection from Point Clouds"; arXiv:1812.05784v2, May 7, 2019; 9 pages.

Tu Jiayin et al., "PP-RCNN: Point-Pillars Feature Set Abstraction for 3D Real-time Object Detection", 2021 International Joint Conference on Neural Networks (IJCNN), Jul. 18, 2021, pp. 1-8, IEEE.

Li Jiong et al., "A Fast Obstacle Detection Method by Fusion of Double-Layer Region Growing Algorithm and Grid-Second Detector", IEEE Access, vol. 9, Dec. 28, 2020, pp. 32053-32063, IEEE.

An Office Action; "Notice of Reasons for Refusal," mailed by the Japanese Patent Office on Aug. 2, 2023, which corresponds to Japanese Patent Application No. 2022-140888 and is related to U.S. Appl. No. 17/929,717.

Yonglin Tian et al., "Context-Aware Dynamic Feature Extraction for 3D Object Detection in Point Clouds", arXiv.org, Jul. 28, 2020, 13 pages, Cornell University Library, NY.

Seiya Shunya et al., "Point Grid Map-Based Mid-To-Mid Driving without Object Detection", 2020 IEEE Intelligent Vehicles Symposium (IV), Oct. 19, 2020, pp. 2044-2051, IEEE.

Wang Zongyue et al., "3D MSSD: A multilayer spatial structure 3D object detection network for mobile LiDAR point clouds", International Journal of Applied Earth Observation and Geoinformation, vol. 102, 102406, Jul. 2, 2021, pp. 1-16, Elsevier.

The extended European search report issued by the European Patent Office on Jan. 19, 2023 which corresponds to European Patent Application No. 22193977.0-1206 and is related to U.S. Appl. No. 17/929,717.

* cited by examiner

METHOD, APPARATUS, AND COMPUTER PROGRAM FOR GENERATING INPUT FEATURE MAP OF ARTIFICIAL INTELLIGENCE MODEL TO DETECT OBJECT BASED ON LiDAR

CROSS-REFERENCE TO RELATED APPLICATION

This application claims priority to and the benefit of Korean Patent Application No. 2021-0118205, filed on Sep. 6, 2021, the disclosure of which is incorporated herein by reference in its entirety.

BACKGROUND

1. Field of the Invention

Various embodiments of the present disclosure relate to a method, apparatus, and computer program for generating an input feature map of an artificial intelligence model to detect an object based on light detection and ranging (LiDAR).

2. Discussion of Related Art

For the convenience of users driving vehicles, vehicles tend to be provided with various sensors and electronic devices (e.g., advanced driver assistance system (ADAS)), and in particular, technology development for an autonomous driving system for a vehicle that recognizes the surrounding environment without driver intervention and automatically drives to a given destination according to the recognized surrounding environment is being actively developed.

Here, the autonomous driving system is a vehicle that recognizes the surrounding environment without driver intervention and automatically travels to a given destination by itself according to the recognized surrounding environment.

In order to control a driving behavior of an autonomous driving vehicle without driver intervention, since an operation of recognizing objects (e.g., obstacles) by recognizing the surrounding environment of the autonomous driving vehicle should necessarily be performed, and more accurately recognizing objects for accident prevention and safety should be required, technology development for detecting objects located around autonomous driving vehicles through various types of sensor data is being actively carried out.

Conventionally, an artificial intelligence model is trained using, as training data, sensor data obtained by detecting the surroundings of the autonomous driving vehicles using a sensor (e.g., light detection and ranging (LiDAR) sensor) provided in the autonomous driving vehicle, and autonomous driving vehicles are controlled to detect and avoid objects (e.g., obstacles) around the autonomous driving vehicle by analyzing the LiDAR sensor data collected in real time using the trained artificial intelligence model.

However, in the case of the conventional method, in order to use the LiDAR sensor data (e.g., a set of (x, y, z) points) in the form of a three-dimensional point cloud as the training data of the artificial intelligence model or the input data of the trained artificial intelligence model, a process of transforming the LiDAR sensor data into a tensor form suitable as the input data of the artificial intelligence model is essential, which causes a problem in that, since the amount of computation increases in the process of generating an input feature map for three-dimensional or two-dimensional convolution, the process of detecting the objects takes a long time.

In addition, when the number of channels of the input feature map is increased in order to derive more accurate result values, there is a problem in that inefficiency in training and inference operations of the artificial intelligence model increases.

SUMMARY OF THE INVENTION

The present disclosure is directed to providing a method, an apparatus, and a computer program for generating an input feature map of an artificial intelligence model to detect an object based on light detection and ranging (LiDAR) that channel-combines a feature map for a distance and angle generated and stored by pre-computing a distance and angle for a preset object detection area around an autonomous driving vehicle with a feature map generated using a LiDAR sensor in the form of a 3D point cloud collected in real time to generate the input feature map of the artificial intelligence model to detect the object based on the LiDAR, that is, more rapidly generate an input feature map using a feature map previously generated through pre-computation, thereby deriving an accurate result value as well as performing rapid training and inference computation of the artificial intelligence model.

The problems of the present disclosure are not limited to the above-described technical objects, and other problems that are not mentioned will be clearly understood by those skilled in the art through the following descriptions.

According to an aspect of the present disclosure, there is provided a method of generating, by a computer apparatus, an input feature map of an artificial intelligence model to detect an object based on light detection and ranging (LiDAR), which includes: collecting LiDAR sensor data in a form of a three-dimensional point cloud for a predetermined area; generating one or more first feature maps by processing the collected LiDAR sensor data based on one or more predefined indicators; and generating the input feature map of the artificial intelligence model by combining, as an independent channel, each of the one or more generated first feature maps with one of the second feature maps previously generated based on a distance and an angle.

The generating of the one or more first feature maps may include: generating a plurality of grid pillars by dividing the collected LiDAR sensor data based on an XY plane; calculating the one or more predefined indicators for each of the plurality of generated grid pillars; and generating the one or more first feature maps by inputting the one or more calculated indicators into a matrix corresponding to the collected LiDAR sensor data.

The one or more predefined indicators may include the number, maximum heights, minimum heights, and an average height of the LiDAR sensor points, and the generating of the one or more first feature maps may include generating, as the independent channel, a first feature map corresponding to each of the number, maximum heights, minimum heights, and average height of the LiDAR sensor points.

The method may further include: generating a plurality of grids having a predetermined size by dividing a preset object detection area based on an XY plane; generating a second feature map related to a distance based on distances between the plurality of generated grids and a reference point; and generating a second feature map related to an angle based on angles between the plurality of generated grids and the reference point.

The generating of the second feature map related to the distance may include: calculating a distance value between center point coordinates of each of the plurality of generated grids and reference point coordinates; standardizing the calculated distance value using a preset maximum distance value; and generating the second feature map related to the distance by inputting the standardized distance value into a matrix corresponding to the preset object detection area.

The generating of the second feature map related to the distance may include: calculating a distance value between the center point coordinates of each of the plurality of generated grids and the reference point coordinates; transforming the calculated distance value using a predefined logarithmic function; and generating the second feature map related to the distance by inputting the transformed distance value into the matrix corresponding to the preset object detection area.

The generating of the second feature map related to the angle may include: calculating an angle value between a line connecting the center point of each of the plurality of generated grids and the reference point and an X axis or a Y axis; transforming the calculated angle value using Euler angle transformation; and generating the second feature map related to the angle by inputting the transformed angle value into the matrix corresponding to the preset object detection area.

The generating of the second feature map related to the angle may include: calculating an angle value between a line connecting the center point of each of the plurality of generated grids and the reference point and an X axis or a Y axis; calculating a trigonometric ratio for the calculated angle value; and generating two second feature maps related to the angle by inputting the calculated trigonometric ratio into the matrix corresponding to the preset object detection area.

According to another aspect of the present disclosure, there is provided an apparatus for generating an input feature map of an artificial intelligence model (AI) to detect an object based on light detection and ranging (LiDAR), which includes: a processor; a network interface; a memory; and a computer program loaded into the memory and executed by the processor, in which the computer program includes: an instruction for collecting LiDAR sensor data in a form of a three-dimensional point cloud for a predetermined area; an instruction for generating one or more first feature maps by processing the collected LiDAR sensor data based on one or more predefined indicators; and an instruction for generating the input feature map of the artificial intelligence model by combining, as an independent channel, each of the one or more generated first feature maps with one of the second feature maps previously generated based on a distance and an angle.

According to still another aspect of the present disclosure, there is provided a computer program recorded on a computer-readable recording medium, wherein the computer program in combination with a computing apparatus executes the following operations of: collecting LiDAR sensor data in a form of a three-dimensional point cloud for a predetermined area; generating one or more first feature maps by processing the collected LiDAR sensor data based on one or more predefined indicators; and generating the input feature map of an artificial intelligence model by combining, as an independent channel, each of the one or more generated first feature maps with one of the second feature maps previously generated based on a distance and an angle.

Other specific details of the present disclosure are included in the detailed description and accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
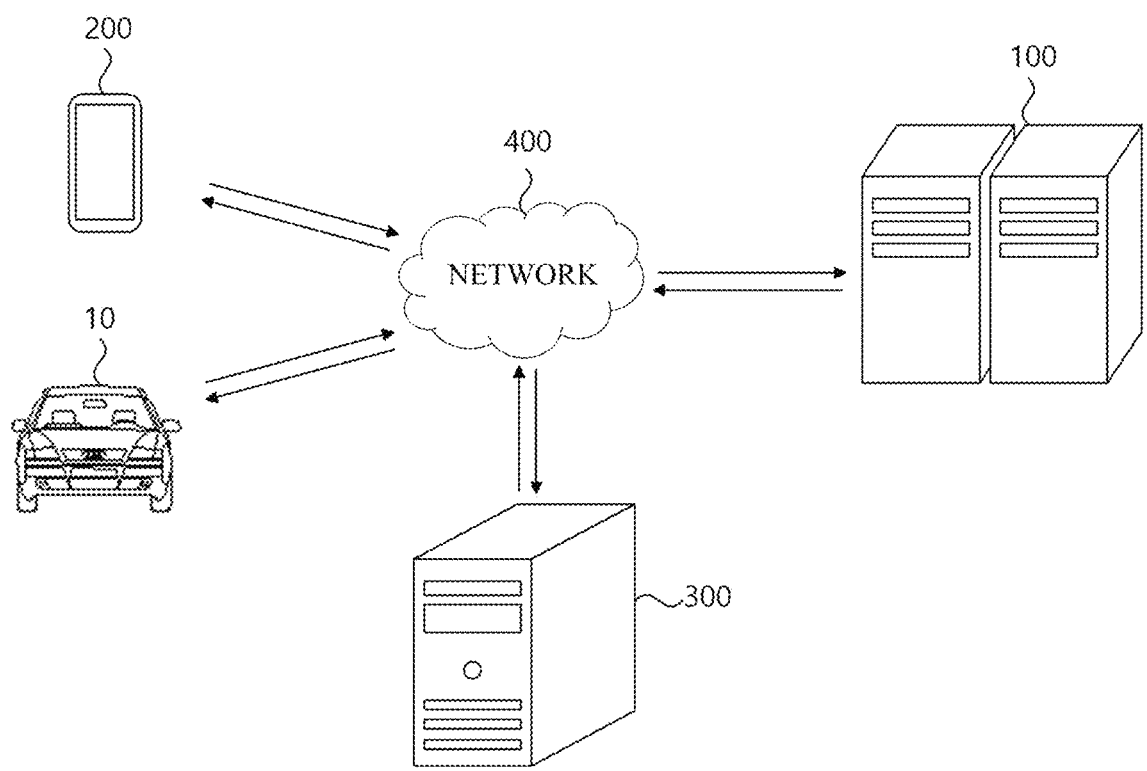
FIG. 1 is a diagram illustrating a system for generating an input feature map of an artificial intelligence model to detect an object based on light detection and ranging (LiDAR) according to an embodiment of the present disclosure.

Various advantages and features of the present disclosure and methods accomplishing them will become apparent from the following description of embodiments with reference to the accompanying drawings. However, the present disclosure is not limited to the embodiments disclosed herein and may be implemented in various forms. The embodiments are provided to make the present disclosure complete so that those skilled in the art can easily understand the scope of the present disclosure. Therefore, the present disclosure will be defined by the scope of the appended claims.

Terms used in the present specification are for explaining the embodiments rather than limiting the present disclosure. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that the first component described below may be the second component within the technical scope of the present disclosure.

Unless defined otherwise, all terms (including technical and scientific terms) used in the present specification have the same meaning as meanings commonly understood by those skilled in the art to which the present disclosure pertains. In addition, terms defined in commonly used dictionaries are not ideally or excessively interpreted unless explicitly defined otherwise.

Further, the term "unit" or "module" used herein means a hardware component such as software, a field-programmable gate array (FPGA), or an application-specific integrated circuit (ASIC) and performs predetermined functions. However, the term "unit" or "module" is not meant to be limited to software or hardware. The "unit" or "module" may be configured to be stored in an addressable storage medium or may be configured to reproduce one or more processors. Accordingly, for example, the "unit" or "module" includes components such as software components, object-oriented software components, class components, and task components, processors, functions, attributes, procedures, subroutines, segments of program code, drivers, firmware, microcode, a circuit, data, a database, data structures, tables, arrays, and variables. Functions provided in components, and the "units" or "modules" may be combined into fewer components, and "units" or "modules" or further separated into additional components, and "units" or "modules."

Spatially relative terms "below," "beneath," "lower," "above," "upper," and the like may be used to easily describe the correlation between one component and other components as illustrated in drawings. The spatially relative terms should be understood as terms including different directions of components during use or operation in addition to the directions illustrated in the drawings. For example, in a case of turning over a component illustrated in the drawings, a component described as "below" or "beneath" another component may be placed "above" another component. Therefore, the illustrative term "below" may include both downward and upward directions. The components can also be aligned in different directions, and therefore the spatially relative terms can be interpreted according to the alignment.

In this specification, the computer means all kinds of hardware devices including at least one processor, and may be understood as including a software configuration which is operated in the corresponding hardware device according to the embodiment. For example, the computer may be understood as a meaning including all of smart phones, tablet PCs, desktops, notebooks, and user clients and applications running on each device, but is not limited thereto.

In addition, a method of generating an input feature map of an artificial intelligence model to detect an object based on light detection and ranging (LiDAR) according to various embodiments of the present disclosure is described as generating an input feature map for detecting objects in a surrounding area of an autonomous driving vehicle for the purpose of driving control of an autonomous driving vehicle, but is not limited thereto, and therefore, can be applied to a general vehicle (e.g., a vehicle in which a driver directly intervenes to perform driving control) or a vehicle operating according to a semi-autonomous driving function (e.g., a function in which a driver directly intervenes to perform driving control, but performs partially autonomous control function only for some functions).

In this case, when applied to a general vehicle or a vehicle operating according to the semi-autonomous driving function, it may generate an input feature map for driving assistance (e.g., providing a collision prevention notification or the like through object detection) rather than generating an input feature map to directly control driving by detecting an object to generate an input feature map.

Hereinafter, embodiments of the present disclosure will be described with reference to the accompanying drawings.

Each operation described in the present specification is described as being performed by a computer, but subjects of each step are not limited thereto, and according to embodiments, at least some of each steps can also be performed on different devices.

FIG. 1 is a diagram illustrating a system for generating an input feature map of an artificial intelligence model to detect an object based on LiDAR according to an embodiment of the present disclosure.

Referring to FIG. 1, the system for generating an input feature map of an artificial intelligence model to detect an object based on LiDAR according to the embodiment of the present disclosure may include an apparatus 100 for generating an input feature map, a user terminal 200, an external server 300, and a network 400.

Here, the system for generating an input feature map of an artificial intelligence model to detect an object based on LiDAR illustrated in FIG. 1 is based on an embodiment, and components of the system are not limited to the embodiment illustrated in FIG. 1, and may be added, changed, or removed as necessary.

In an embodiment, the apparatus 100 for generating an input feature map may analyze LiDAR sensor data in the form of a three-dimensional point cloud to train an artificial intelligence model to detect objects around the autonomous driving vehicle 10, and generate an input feature map of the artificial intelligence model to detect objects around the autonomous driving vehicle 10 using the pre-trained artificial intelligence model. For example, the apparatus 100 for generating an input feature map may be connected to the autonomous driving vehicle 10 through the network 400, and receive the LiDAR sensor data collected from a sensor (e.g., LiDAR sensor) provided in the autonomous driving vehicle 10 to generate the input feature map.

Here, the artificial intelligence model may be a deep learning model (e.g. convolutional neural network (CNN)) for analyzing the LiDAR sensor data in the form of the three-dimensional cloud, but is not limited thereto.

The artificial intelligence model is composed of one or more network functions, and the one or more network functions may be composed of a set of interconnected computational units, which may be generally referred to as "nodes." These 'nodes' may also be referred to as "neurons." One or more network functions are configured by including at least one or more nodes. The nodes (or neurons) constituting one or more network functions may be interconnected by one or more "links."

In the artificial intelligence model, one or more nodes connected through a link may relatively form a relationship between an input node and an output node. The concepts of the input node and the output node are relative. Any node that has an output node relationship with respect to one node may have an input node relationship with respect to other nodes, and vice versa. As described above, an input node to output node relationship may be generated around the link. One or more output nodes may be connected to one or more input nodes through the link, and vice versa.

In the relationship between the input node and the output node connected through one link, a value of the output node may be determined based on data input to the input node.

Here, a node interconnecting the input node and the output node may have a weight. The weight may be variable, and may be changed by a user or an algorithm in order for the artificial intelligence model to perform a desired function. For example, when one or more input nodes are interconnected to one or more output nodes by respective links, the output node may determine output node values based on values input to input nodes connected to the output nodes and weights set in links corresponding to each input node.

As described above, regarding the artificial intelligence model, one or more nodes are interconnected through one or more links to form the relationship of the input node and the output node within the artificial intelligence model. The characteristics of the artificial intelligence model may be determined according to the number of nodes and links in the artificial intelligence model, the correlation between the nodes and links, and values of weights assigned to each of the links. For example, when the same number of nodes and links are present and there are two artificial intelligence models having different values of weights between the links, the two artificial intelligence models may be recognized as being different from each other.

Some of the nodes constituting the artificial intelligence model may constitute one layer based on distances from an initial input node. For example, a set of nodes having a distance n from the initial input node may constitute n layers. The distance from the initial input node may be defined by the minimum number of links that should be passed to reach the corresponding node from the initial input node. However, the definition of such a layer is arbitrary for explanation, and the order of the layers in the artificial intelligence model may be defined in a different way from the above. For example, the layers of nodes may be defined by a distance from the final output node.

The initial input node may be one or more nodes to which data is directly input without passing through a link in the relationship with other nodes among nodes in the artificial intelligence model. Alternatively, within the artificial intelligence model network, in the relationship between nodes based on a link, the initial input node may be nodes that do not have other input nodes connected by the link. Similarly, a last output node may be one or more nodes that do not have an output node in the relationship with other nodes among nodes in the artificial intelligence model. In addition, a hidden node may be nodes constituting the artificial intelligence model, not the initial input node and the last output node. The artificial intelligence model according to an embodiment of the present disclosure may be an artificial intelligence model having the form in which the number of nodes of an input layer may be greater than that of the hidden layer close to an output layer, and the number of nodes decreases as the input layer progresses to the hidden layer.

The artificial intelligence model may contain one or more hidden layers. The hidden node of the hidden layer may have an output of a previous layer and outputs of neighboring hidden nodes as inputs. The number of hidden nodes for each hidden layer may be the same or different. The number of nodes of the input layer may be determined based on the number of data fields of the input data and may be the same as or different from the number of hidden nodes. Input data input to the input layer may be calculated by a hidden node of the hidden layer and may be output by a fully connected layer (FCL) that is an output layer.

In various embodiments, the artificial intelligence model may be subjected to supervised learning using the LiDAR sensor data labeled with information on an object as training data. However, the present disclosure is not limited thereto, and various learning methods may be applied.

Here, the supervised learning is usually a method of generating training data by labeling specific data and information related to specific data and performing training using the generated training data, and is a method of labeling two pieces of data with a causal relationship to generate training data and performing training using the generated training data.

More specifically, the apparatus 100 for generating an input feature map may train one or more network functions constituting the artificial intelligence model using the labeled training data. For example, the apparatus 100 for generating an input feature map may input each piece of the training input data to one or more network functions, and compare each piece of the output data calculated by the one or more network functions with each piece of the training output data corresponding to labels of each piece of the training input data, thereby deriving errors. That is, in the training of the artificial intelligence model, the training input data may be input to the input layer of one or more network functions, and the training output data may be compared with the outputs of one or more network functions.

The apparatus 100 for generating an input feature map may train the artificial intelligence model based on an operation result of one or more network functions for the training input data and an error of the training output data (label).

In addition, the apparatus 100 for generating an input feature map may adjust the weights of one or more network functions in a backpropagation manner based on the error. That is, the apparatus 100 for generating an input feature map may adjust the weights so that the output of one or more network functions approaches the training output data based on the operation result of one or more network functions for the training input data and the error of the training output data.

The apparatus 100 for generating an input feature map may determine whether to stop training using validation data when the training of one or more network functions is performed over a predetermined epoch. The predetermined epoch may be a part of the overall training objective epoch.

The validation data may be composed of at least a portion of the labeled training data. That is, the apparatus 100 for generating an input feature map may train the artificial intelligence model through the training data, and after the training of the artificial intelligence model is repeated over the predetermined epoch, may determine whether the training effect of the artificial intelligence model using the validation data is more than a predetermined level. For example, when performing training with a target iterative learning number corresponding to 10 using 100 pieces of training data, the apparatus 100 for generating an input feature map may perform 10 iterations of learning, which is the predetermined epoch, and then perform three iterations of learning using 10 pieces of validation data to determine that it is meaningless to perform further learning when the change in the output of the artificial intelligence model while three iterations of learning is performed is the predetermined level or less and terminate the learning.

That is, the validation data may be used to determine the completion of the training based on whether the training effect for each epoch is greater than or less than the predetermined level in the iterative learning of the artificial intelligence model. The above-described training data, the number of pieces of validation data and the number of iterations are merely examples and are not limited thereto.

The apparatus 100 for generating an input feature map may test the performance of one or more network functions using test data to determine whether to activate one or more network functions to generate the artificial intelligence model. The test data may be used to validate the performance of the artificial intelligence model, and may be composed of at least a part of the training data. For example, 70% of the training data may be used to train the artificial intelligence model (i.e., learning to adjust weights to output result values similar to labels), and 30% of the training data may be used as test data for the validation of the performance of the artificial intelligence model. The apparatus 100 for generating an input feature map may determine whether to activate the artificial intelligence model according to whether the performance of the artificial intelligence model is the predetermined level or more by inputting the test data to the trained artificial intelligence model and measuring the error.

The apparatus 100 for generating an input feature map may validate the performance of the trained artificial intelligence model using the test data on the trained artificial intelligence model, and activate the artificial intelligence model so that the artificial intelligence model is used in other applications when the performance of the trained artificial intelligence model is the predetermined criterion or more.

In addition, the apparatus 100 for generating an input feature map may be inactivate and discard the artificial intelligence model when the performance of the learned artificial intelligence model is less than the predetermined criterion. For example, the apparatus 100 for generating an input feature map may determine the performance of the artificial intelligence model generated based on factors such as accuracy, precision, and recall. The above-described performance evaluation criteria are merely examples and are not limited thereto. According to an embodiment of the present disclosure, the apparatus 100 for generating an input feature map may generate a plurality of artificial intelligence model models by independently training each artificial intelligence model, and use only the artificial intelligence model with certain performance or more by evaluation of the performance. However, the present disclosure is not limited thereto.

In various embodiments, the apparatus 100 for generating an input feature map may be connected to the user terminal 200 through the network 400, and may provide the results of detecting objects around the autonomous driving vehicle 10 using the input feature map generated according to the method of generating an input feature map of an artificial intelligence model to detect an object based on LiDAR, or provide guidance (e.g., driving guidance, etc.) information according to the results of detecting objects.

Here, the user terminal 200 is a wireless communication apparatus in which portability and mobility are guaranteed, and examples thereof may include all types of handheld-based wireless communication device such as a navigation system, personal communication system (PCS), global system for mobile communication (GSM), personal digital cellular (PDC), personal handyphone system (PHS), personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, a tablet PC, and the like, but is not limited thereto, and the user terminal 200 may be an infotainment system for a vehicle provided in the vehicle 10.

In addition, here, the network 400 is a connection structure in which information exchange is possible between each node such as a plurality of terminals and servers, and examples of such a network may include a local area network (LAN), a wide area network (WAN), the Internet (WWW: World Wide Web), a wired/wireless data communication network, a telephone network, a wired/wireless television communication network, and the like. Here, the wireless data communication network includes 3G, 4G, 5G, 3rd Generation Partnership Project (3GPP), 5th Generation Partnership Project (5GPP), Long Term Evolution (LTE), World Interoperability for Microwave Access (WiMAX), Wireless Fidelity (Wi-Fi), Internet, a local area network (LAN), a wireless local area network (Wireless LAN), a wide area network (WAN), a personal area network (PAN), radio frequency (RF), a Bluetooth network, a near-field communication (NFC) network, a satellite broadcast network, an analog broadcast network, a digital multimedia broadcasting (DMB) network, or the like, but are not limited thereto.

Figure 2:
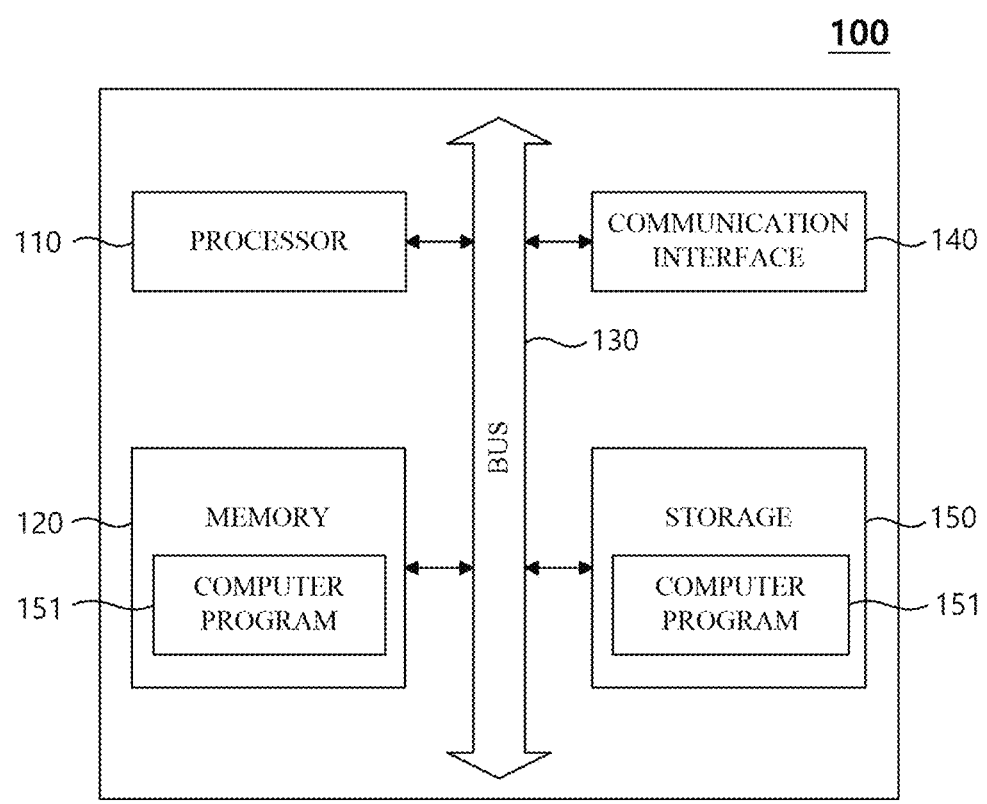
FIG. 2 is a hardware configuration diagram of an apparatus for generating an input feature map of an artificial intelligence model to detect an object based on LiDAR according to another embodiment of the present disclosure.

In an embodiment, the external server 300 may be connected to the apparatus 100 for generating an input feature map through the network 400, and may store and manage information/data necessary for performing a process of generating an input feature map of the apparatus 100 for generating an input feature map of an artificial intelligence model to detect an object based on LiDAR and information/data generated by performing a process of generating an input feature map of an artificial intelligence model to detect an object based on LiDAR Hereinafter, a hardware configuration of the apparatus 100 for generating an input feature map for performing the method of generating an input feature map of an artificial intelligence model to detect an object based on LiDAR will be described with reference to FIG. 2.

FIG. 2 is a hardware configuration diagram of an apparatus for generating an input feature map of an artificial intelligence model to detect an object based on LiDAR according to another embodiment of the present disclosure.

Referring to FIG. 2, an apparatus 100 (hereinafter, "computing apparatus 100") for generating an input feature map of an artificial intelligence model to detect an object based on LiDAR according to another embodiment of the present disclosure may include one or more processors 110, a memory 120 for loading a computer program 151 executed by the processor 110, a bus 130, a communication interface 140, and a storage 150 for storing the computer program 151. Here, only the components related to the embodiment of the present disclosure are illustrated in FIG. 2. Accordingly, one of ordinary skill in the art to which the present disclosure pertains may understand other general-purpose components other than the components illustrated in FIG. 2 may be further included.

The processor 110 controls the overall operation of each configuration of the computing apparatus 100. The processor 110 may be configured to include a central processing unit (CPU), a micro processor unit (MPU), a micro controller unit (MCU), a graphics processing unit (GPU), or any type of processor well known in the technical field of the present disclosure.

In addition, the processor 110 may perform an operation for at least one application or program for executing the method according to the embodiments of the present disclosure, and the computing apparatus 100 may include one or more processors.

In various embodiments, the processor 110 may further include a random access memory (RAM) (not illustrated) and a read-only memory (ROM) for temporarily and/or permanently storing signals (or data) processed in the processor 110. In addition, the processor 110 may be implemented in the form of a system-on-chip (SoC) including at least one of the graphics processing unit, the RAM, and the ROM.

The memory 120 stores various types of data, commands and/or information. The memory 120 may load the computer program 151 from the storage 150 to execute methods/operations according to various embodiments of the present disclosure. When the computer program 151 is loaded into the memory 120, the processor 110 may perform the methods/operations by executing one or more instructions constituting the computer program 151. The memory 120 may be implemented as a volatile memory such as RAM, but the technical scope of the present disclosure is not limited thereto.

The bus 130 provides a communication function between components of the computing apparatus 100. The bus 130 may be implemented as various types of buses, such as an address bus, a data bus, or a control bus.

The communication interface 140 supports wired/wireless Internet communication of the computing apparatus 100. In addition, the communication interface 140 may support various communication methods other than Internet communication. To this end, the communication interface 140 may include a communication module well known in the technical field of the present disclosure. In some embodiments, the communication interface 140 may be omitted.

The storage 150 may non-temporarily store the computer program 151. When performing the input feature map generation process of the artificial intelligence model to detect an object based on LiDAR through the computing apparatus 100, the storage 150 may store various pieces of information necessary to provide the process of generating an input feature map of an artificial intelligence model to detect an object based on LiDAR.

The storage 150 may be configured to include a nonvolatile memory, such as a ROM, an erasable programmable ROM (EPROM), an electrically erasable programmable ROM (EEPROM), and a flash memory, a hard disk, a removable disk, or any well-known computer-readable recording medium in the art to which the present disclosure belongs.

The computer program 151 may include one or more instructions to, when loaded into the memory 120, cause the processor 110 to perform the methods/operations according to various embodiments of the present disclosure. That is, the processor 110 may perform the methods/operations according to various embodiments of the present disclosure by executing the one or more instructions.

In an embodiment, the computer program 151 may include one or more instructions to perform the method of generating an input feature map of an artificial intelligence model to detect an object based on LiDAR, the method including collecting LiDAR sensor data in the form of a three-dimensional point cloud for a predetermined area, generating one or more first feature maps by processing the collected LiDAR sensor data based on one or more predefined indicators, and generating an input feature map of the artificial intelligence model by combining, as individual channels, each of the one or more generated first feature maps with one of second feature maps previously generated based on a distance and angle.

Steps of the method or algorithm described with reference to the embodiment of the present disclosure may be directly implemented in hardware, in software modules executed by hardware, or in a combination thereof. The software module may reside in a RAM, a ROM, an EPROM, an EEPROM, a flash memory, a hard disk, a removable disk, a CD-ROM, or in any form of computer readable recording medium known in the art to which the invention pertains.

The components of the present disclosure may be embodied as a program (or application) and stored in a medium for execution in combination with a computer which is hardware. The components of the present disclosure may be executed in software programming or software elements, and similarly, embodiments may be implemented with programming or scripting languages such as C, C++, Java, and assembler, including various algorithms implemented in a combination of data structures, processes, routines, or other programming constructs. Functional aspects may be implemented with algorithms executed on one or more processors. Hereinafter, the method of generating an input feature map of an artificial intelligence model to detect an object based on LiDAR performed by the computing apparatus 100 will be described with reference to FIGS. 3 to 8.

Figure 3:
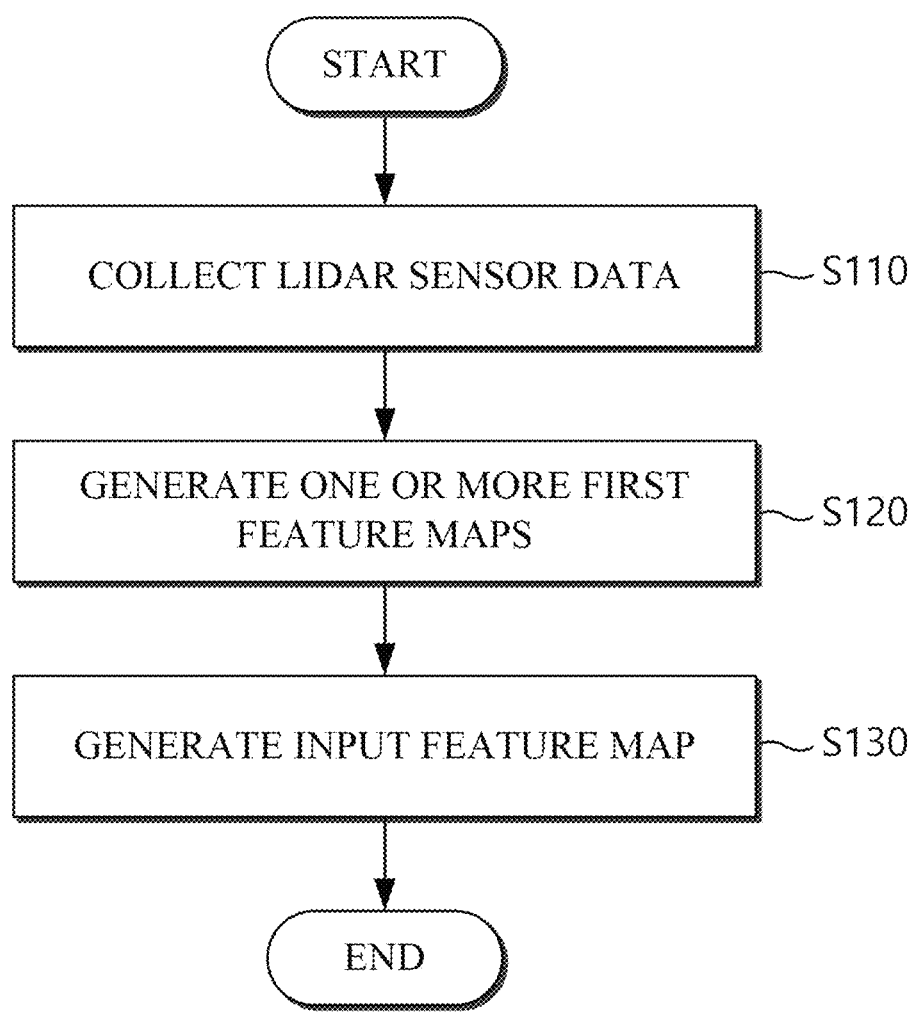
FIG. 3 is a flowchart of a method of generating an input feature map of an artificial intelligence model to detect an object based on LiDAR according to another embodiment of the present disclosure.

FIG. 3 is a flowchart of a method of generating an input feature map of an artificial intelligence model to detect an object based on LiDAR according to another embodiment of the present disclosure.

Referring to FIG. 3, in operation S110, the computing apparatus 100 may collect LiDAR sensor data for a predetermined area. For example, the computing apparatus 100 may be connected to the autonomous driving vehicle 10 through the network 400, and may receive LiDAR sensor data collected from a LiDAR sensor provided in the autonomous driving vehicle 10. However, the present disclosure is not limited thereto.

Here, the LiDAR sensor data may be in the form of a 3D point cloud including a plurality of LiDAR sensor points having three-dimensional coordinate values, but is not limited thereto.

Also, here, the computing apparatus 100 is described as collecting the LiDAR sensor data to generate the input feature map, but is not limited thereto, and any sensor data used for detecting objects around the autonomous driving vehicle 10 is applicable.

In operation S120, the computing apparatus 100 may generate one or more first feature maps by processing the LiDAR sensor data collected through operation S110.

In various embodiments, the computing apparatus 100 may generate first feature maps corresponding to each indicator by processing the LiDAR sensor data in the form of the three-dimensional point cloud based on one or more predefined indicators (e.g., density (e.g., the number of LiDAR sensor points), maximum height, minimum height, average height, etc.). Hereinafter, a method of generating a first feature map will be described in more detail with reference to FIGS. 4 and 5.

Figure 4:
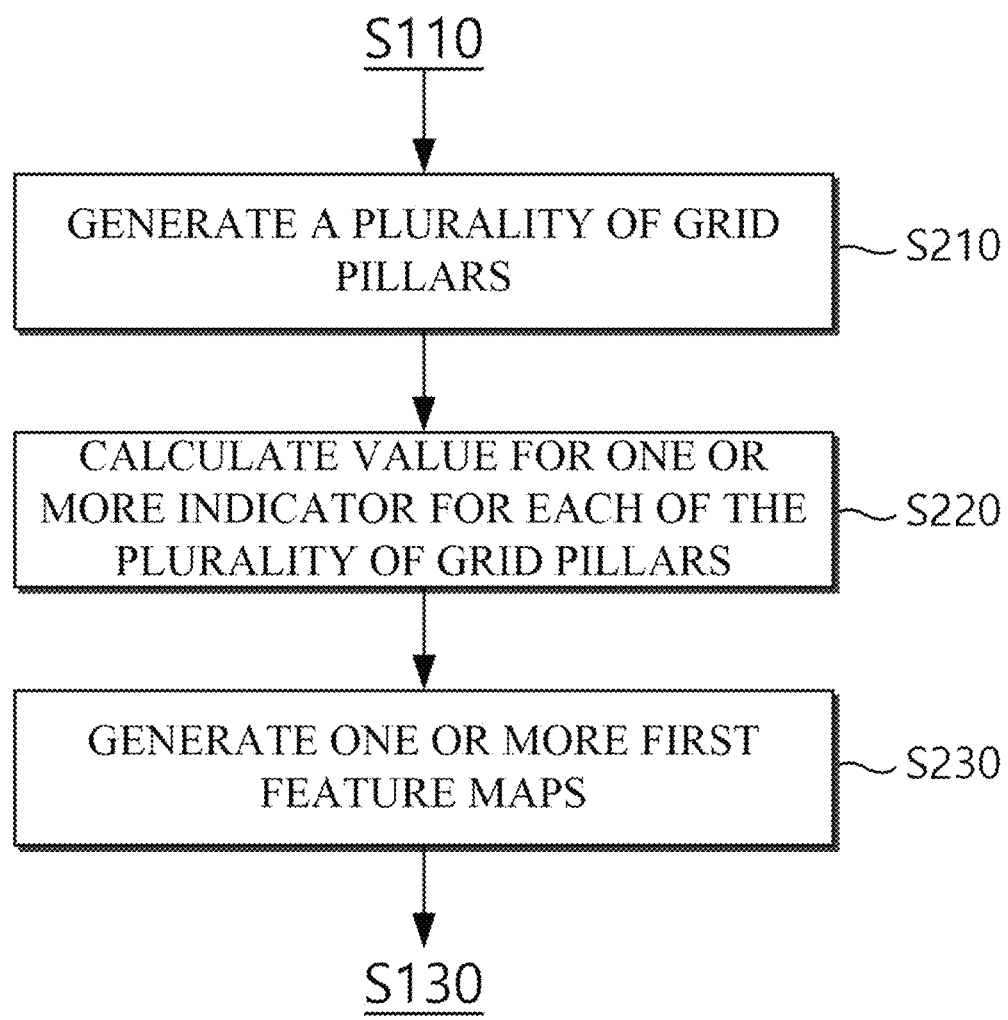
FIG. 4 is a flowchart for describing a method of generating one or more first feature maps, according to various embodiments.
Figure 5:
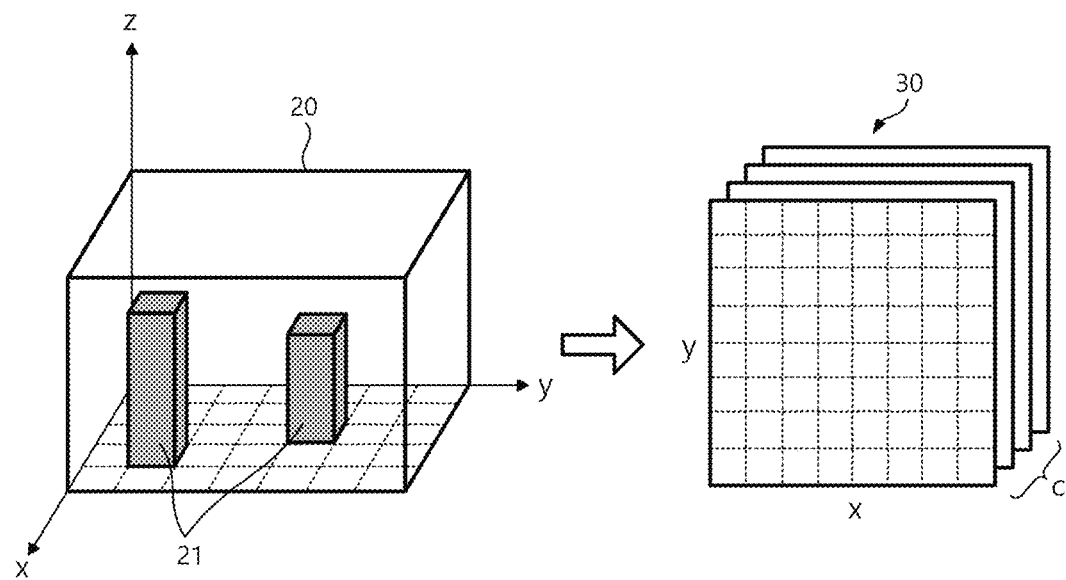
FIG. 5 is a diagram illustrating a process of generating one or more first feature maps according to various embodiments.

FIG. 4 is a flowchart illustrating a method of generating one or more first feature maps in various embodiments, and FIG. 5 is a diagram illustrating a process of generating one or more first feature maps in various embodiments.

Referring to FIGS. 4 and 5, in operation S210, the computing apparatus 100 may generate a plurality of grid pillars 21. For example, the computing apparatus 100 may generate the plurality of grid pillars 21 by dividing the LiDAR sensor data 20 in the form of the three-dimensional point cloud including an XY plane, an XZ plane, and a YZ plane based on the XY plane. For example, the computing apparatus 100 may divide a space of the LiDAR sensor data 20 in the form of the three-dimensional point cloud using the divided XY plane to include a grid (e.g., 0.1 m*0.1 m) having a predetermined size, thereby generating the plurality of grid pillars 21 having a bottom surface of the same size and shape as a grid of a predetermined size and a predetermined height in a Z-axis direction. However, the present disclosure is not limited thereto, and the computing apparatus 100 may be implemented in various forms such as dividing the LiDAR sensor data 20 in the form of the three-dimensional point cloud based on the XZ plane or the YZ plane.

In operation S220, the computing apparatus 100 may calculate values for one or more predefined indicators for each of the plurality of grid pillars 21 generated in operation S210. For example, when one or more predefined indicators include the number (density), maximum height, minimum height, and average height of the LiDAR sensor points, the computing apparatus 100 may calculate the number, maximum heights, minimum heights, and an average height of the LiDAR sensor points for the plurality of grid pillars 21.

Here, one or more indicators are predefined by a user for the purpose of detecting objects around the autonomous driving vehicle 10, and are described as the number (density), maximum height, minimum height, and average height of the LiDAR sensor points, but the present disclosure is not limited thereto, and any indicator for object detection may be applied.

In operation S230, the computing apparatus 100 may generate a first feature map using the indicator calculated in operation S220.

In various embodiments, the computing apparatus 100 may generate a first feature map by inputting the indicator values calculated for each of the plurality of grid pillars 21 into a matrix corresponding to the LiDAR sensor data 20.

Here, the matrix corresponding to the LiDAR sensor data 20 is a template preset for generating the first feature map by inputting and arranging indicator values for each of the plurality of grid pillars 21, and is implemented in the form of a matrix of M rows and N columns, in which the number of rows and columns included in the matrix may be determined according to the number and arrangement of the plurality of grid pillars 21 (e.g., the same shape as the XY plane (plane divided with a plurality of grids of a certain size) used in generating the plurality of grid pillars 21).

In various embodiments, the computing apparatus 100 may input an indicator for a grid pillar 21 located in a first row and first column among the plurality of grid pillars 21 to a first row and first column of a matrix, and input an indicator for a first row and second column to a first row and second column of a matrix to generate the first feature map.

In various embodiments, the computing apparatus 100 may generate, as an independent channel, a first feature map corresponding to each of the number, maximum heights, minimum heights, and average height of the LiDAR sensor points, and channel-combine the independently generated first feature maps to generate the first feature map. For example, as illustrated in FIG. 5, the computing apparatus 100 may generate a first feature map corresponding to the LiDAR sensor point, a first feature map corresponding to a maximum height, a first feature map corresponding to a minimum height, and a first feature map corresponding to an average height, that is, a total four of first feature maps according to the number of calculated indicators, and channel-combine four first feature maps to generate a three-dimensional first feature map 30 with a width and length of x and y and a height of 4.

Referring back to FIG. 3, in operation S130, the computing apparatus 100 may combine, as individual channels, one or more first feature maps generated in operation S120 and each of the second feature maps previously generated based on a distance and angle to generate the input feature map of the artificial intelligence model.

Here, the second feature map previously generated based on the distance and angle may be a feature map previously generated and stored for the object detection area so that the artificial intelligence model may derive features according to a distance and angle in consideration of the distance and angle for the LiDAR sensor points.

In general, when the LiDAR sensor data 20 is expressed in an X and Y space, the LiDAR sensor data 20 has features according to the distance and angle. For example, the LiDAR sensor data 20 has a feature that the number (density) of LiDAR sensor points decreases rapidly as the distance increases. In addition, the LiDAR sensor data 20 is displayed as a line when an occlusion occurs in the X and Y space, and has a feature that locations of obstacles vary according to locations of origin reference coordinates.

Meanwhile, since the conventional artificial intelligence model operates independently of the location, the location information for each of a plurality of grids is not present in the input feature map for the training and inference of the artificial intelligence model, so there is a limitation in that the conventional artificial intelligence model may not consider the features of the distance and angle as described above.

Taking this into account, the computing apparatus 100 may previously generate and store the second feature map related to the distance and angle so that the artificial intelligence model may consider the distance and angle for the LiDAR sensor points, and generate the input feature map including the information on the distance and angle to be able to consider the channel combination with one or more first feature maps generated through the LiDAR sensor data collected in real time, that is, the features for the distance and angle as described above. Hereinafter, the method of generating a second feature map related to a distance and an angle performed by the computing apparatus 100 will be described with reference to FIGS. 6 to 8.

Figure 6:
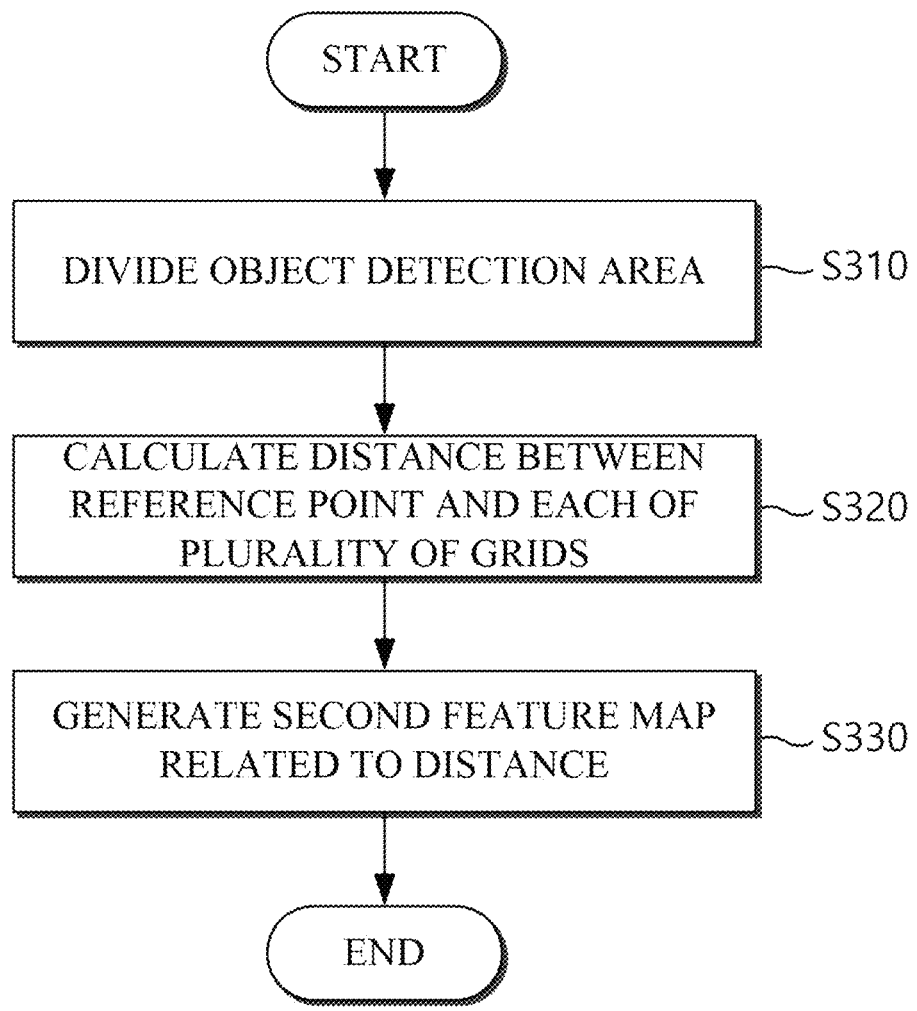
FIG. 6 is a flowchart for describing a method of generating a second feature map related to a distance according to various embodiments.

FIG. 6 is a flowchart for describing a method of generating a second feature map related to a distance according to various embodiments.

Referring to FIG. 6, in operation S310, the computing apparatus 100 may generate a plurality of grids having a predetermined size by dividing a preset object detection area based on the XY plane.

Here, the object detection area may be an area in which the surroundings of the autonomous driving vehicle 10 are sensing through the LiDAR sensor, and may be an area having the same attributes (e.g., size, shape) as the collection area of the LiDAR sensor data 20 collected through operation S110, but is not limited thereto.

In addition, here, the predetermined size may be the same size as the grid included in the XY plane (XY plane divided to include grids of a predetermined size) used to divide the space of the LiDAR sensor data 20 (e.g., 0.1 m*0.1 m), but is not limited thereto.

In operation S320, the computing apparatus 100 may calculate a distance value between the plurality of grids generated through operation S310 and a reference point.

In various embodiments, the computing apparatus 100 may calculate a distance value between center point coordinates of each of the plurality of grids and reference point coordinates (e.g., origin coordinates), and standardize the calculated distance value using a preset maximum distance value. For example, the computing apparatus 100 may calculate a standardized distance value (e.g., first distance value) between the center point coordinates and the reference point coordinates of each of the plurality of grids using Equation 1 below.

$$D_{1(ij)} = \frac{\sqrt{(x_{ij} - x_{ref})^2 + (y_{ij} - y_{ref})^2}}{D_{max}} \qquad \langle \text{Equation 1} \rangle$$

Here, $D_{1(ij)}$ may denote a standardized distance value (e.g., first distance value) between a grid located in row i and column j and the reference point, $x_{ij}$ and $y_{ij}$ may denote x and y coordinates of the grid center point located in row i and column j, $x_{ref}$ and $y_{ref}$ may denote an x coordinate and y coordinate of the reference point, and $D_{max}$ may denote a preset maximum distance value. Here, the reference point may be the origin, and the reference point coordinates may be (0, 0), but is not limited thereto.

That is, the computing apparatus 100 may calculate a distance value between the reference point coordinates and the center point coordinates of each of the plurality of grids, and may standardize the calculated distance value by dividing the calculated distance value by a preset maximum distance value (e.g., 100 m), so that the distance value between the reference point coordinates and the center point coordinates of each of the plurality of grids is in the range of 0 to 1.

In various embodiments, the computing apparatus 100 may calculate the distance value between the center point coordinates of each of the plurality of grids and the reference point coordinates (e.g., origin coordinates), and transform the calculated distance value using a predefined logarithmic function. For example, the computing apparatus 100 may calculate the transformed distance value (e.g., second distance value) between the center point coordinates and the reference point coordinates of each of the plurality of grids using Equation 2 below.

$$D_{2(ij)} = \log \sqrt{(x_{ij} = x_{ref})^2 + (y_{ij} - y_{ref})^2} + 1 \qquad \text{<Equation 2>}$$

Here, $D_{2(ij)}$ may denote the transformed distance value (e.g., second distance value) between a grid located in row i and column j and the reference point, $x_{ij}$ and $y_{ij}$ may denote x and y coordinates of the grid center point located in row i and column j, and $x_{ref}$ and $y_{ref}$ may denote the x coordinate and y coordinate of the reference point. Here, the reference point may be the origin, and the reference point coordinates may be (0, 0), but is not limited thereto.

That is, the computing apparatus 100 may calculate the distance value between the reference point coordinates and the center point coordinates of each of the plurality of grids, but may transform the distance value calculated through the logarithmic function to limit the range of the input value.

In operation S330, the computing apparatus 100 may generate the second feature map related to the distance using the distance value calculated in operation S320.

In various embodiments, the computing apparatus 100 may input the distance value (e.g., a standardized distance value or a distance value transformed through a logarithmic function) calculated according to the above method to the matrix corresponding to the preset object detection area to generate the second feature map.

Here, the matrix corresponding to the object detection area is a template previously set to generate the second feature map by inputting and arranging the distance values between the reference point coordinates and the center point coordinates of each of the plurality of grids, and may be implemented in the form of a matrix of M rows and N columns. In this case, the matrix corresponding to the object detection area may be implemented in the same form as the matrix corresponding to the LiDAR sensor data 20 in order to channel-combine the first feature map and the second feature map related to distance and angle, but is limited thereto.

Figure 8:
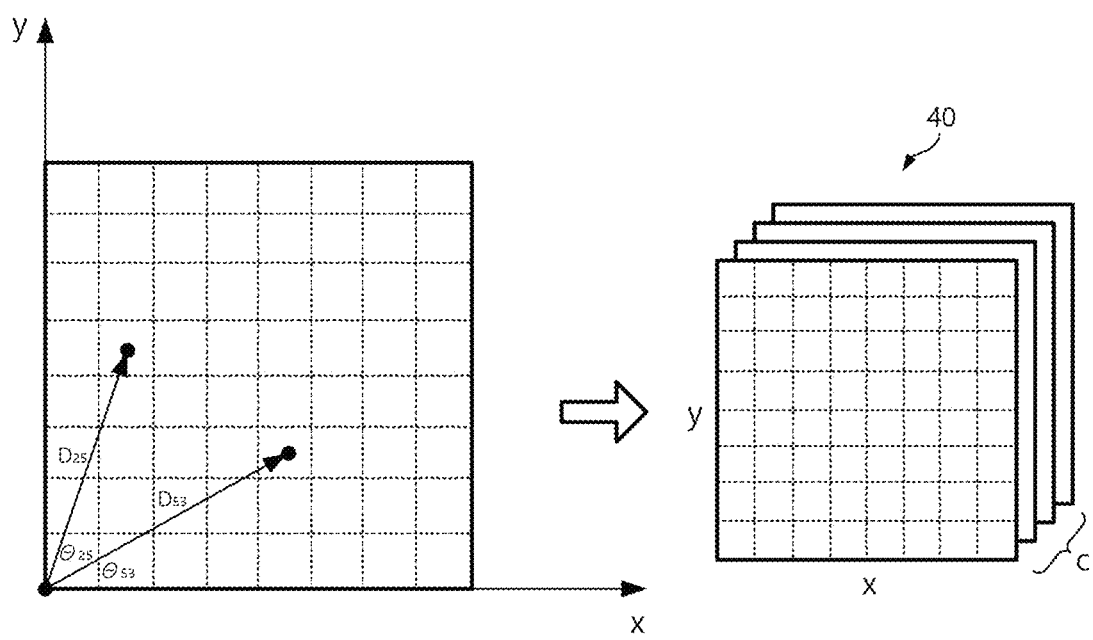
FIG. 8 is a diagram illustrating a process of generating a second feature map related to a distance and an angle according to various embodiments.

In various embodiments, as illustrated in FIG. 8, the computing apparatus 100 may input a distance value D25 (e.g., a first distance value or a second distance) between a grid located in a second row and fifth column among a plurality of grids and a reference point to a second row and fifth column of a matrix and input a distance value D53 between a grid located in a fifth row and third column and the reference point to a fifth row and third column of a matrix to generate the second feature map related to the distance.

In various embodiments, the computing apparatus 100 may generate, as an independent channel, second feature maps for each of the first distance value and the second distance value calculated according to the above method, and generate the three-dimensional second feature map 40 related to the distance by channel-combining the independently generated second feature maps.

Figure 7:
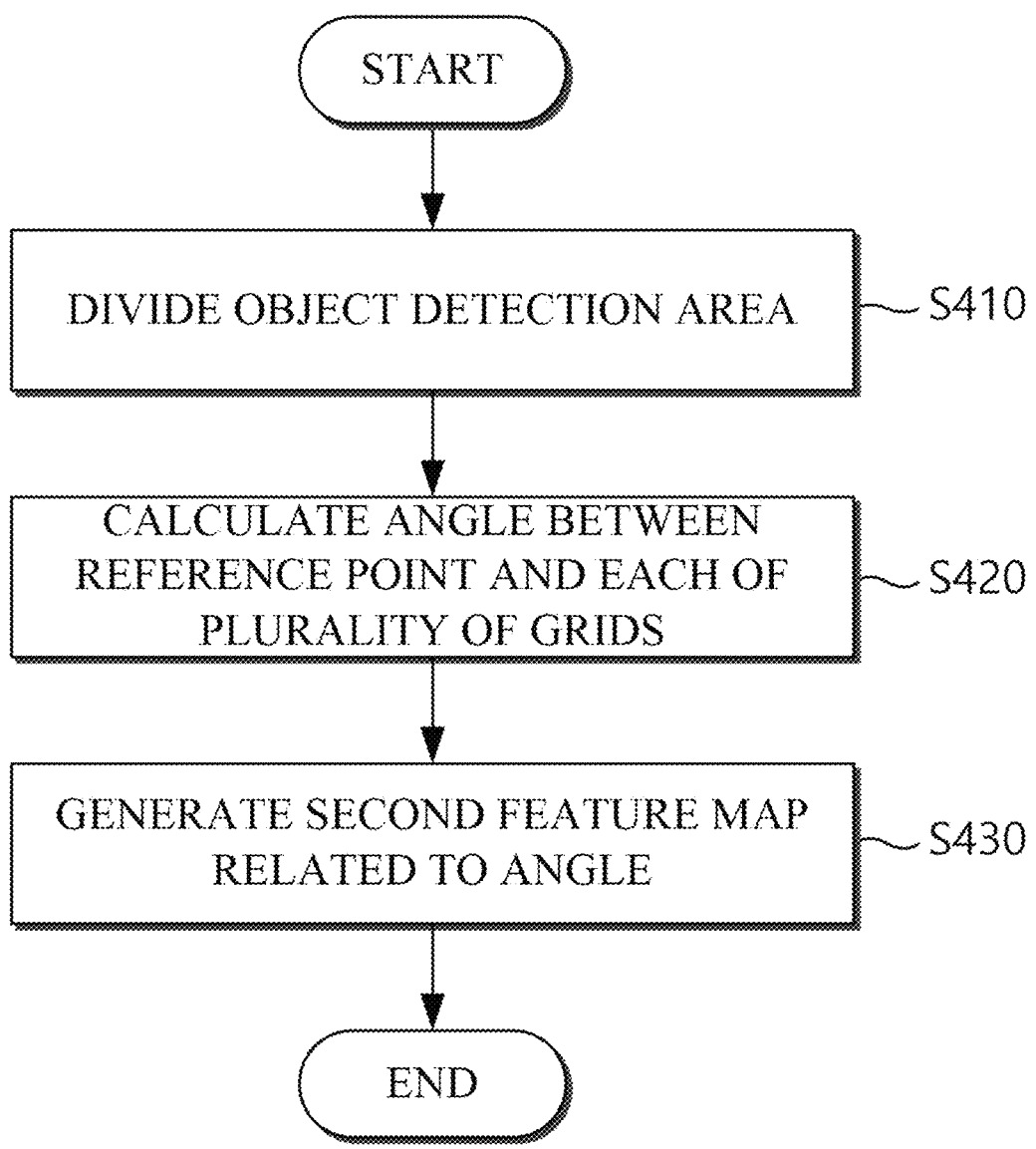
FIG. 7 is a flowchart for describing a method of generating a second feature map related to an angle according to various embodiments.

FIG. 7 is a flowchart for describing a method of generating a second feature map related to an angle according to various embodiments.

Referring to FIG. 7, in operation S410, the computing apparatus 100 may generate a plurality of grids having a predetermined size by dividing the preset object detection area based on the XY plane. Here, the operation of generating a plurality of grids performed by the computing apparatus 100 may be implemented in the same form as the operation of generating a plurality of grids performed in operation S310 of FIG. 6, but is not limited thereto.

In operation S420, the computing apparatus 100 may calculate an angle value between the plurality of grids generated through operation S410 and the reference point.

In various embodiments, the computing apparatus 100 may calculate a first angle value by transforming the angle between the plurality of grids and the reference point into an Euler angle using Euler angle transformation. Here, as the method of transforming an angle value into an Euler angle using Euler angle transformation, various techniques such as a method of transforming an angle value into an Euler angle using a predefined transformation matrix (e.g., a transformation matrix when rotating with an x axis, a y axis, and a z axis, respectively, as a rotation axis) are known, and these known techniques may be selectively applied. In the present specification, a method of transforming an angle value into an Euler angle using Euler angle transformation is not specifically limited.

In various embodiments, the computing apparatus 100 may calculate a trigonometric ratio for an angle value between a plurality of grids and a reference point as a second angle value. For example, the computing apparatus 100 may calculate a sine value and a cosine value for an angle between a plurality of grids and a reference point. That is, the computing apparatus 100 may calculate a sine value and a cosine value for an angle between a plurality of grids and a reference point in order to generate a second feature map related to an angle, thereby setting a range of the calculated angle value to be a value in the range of −1 to 1 as well as solving the problem of a distance error of periodicity in an Euler space.

In operation S430, the computing apparatus 100 may generate a second feature map related to an angle using the angle value calculated in operation S420.

In various embodiments, the computing apparatus 100 may input the angle value (e.g., a first angle value and a second angle value) calculated according to the above method to the matrix corresponding to the preset object detection area to generate the second feature map. For example, as illustrated in FIG. 8, the computing apparatus 100 may input an angle value θ25 between a grid located in a second row and fifth column among a plurality of grids and a reference point to a second row and fifth column of a matrix and input a distance value θ53 between a grid located in a fifth row and third column and a reference point to a fifth row and third column of a matrix to generate the second feature map related to the angle.

In this case, when the angle value calculated according to the above method has two or more second angle values between the plurality of grids and the reference point, that is, when the angle value calculated according to the above method is a sine value and a cosine value of the trigonometric ratio calculated using the angle between the plurality of grids and the reference point, the computing apparatus 100 may generate a second feature map corresponding to the sine value and a second feature map corresponding to the cosine value as separate channels, respectively.

In various embodiments, the computing apparatus 100 may generate, as an independent channel, second feature maps for each of the first angle value and the second angle value calculated according to the above method, and generate the three-dimensional second feature map 40 related to the angle by channel-combining the independently generated second feature maps.

That is, the computing apparatus 100 may channel-combine the second feature map related to the distance and the second feature map related to the angle with the first feature map generated by processing the LiDAR sensor data collected in real time, thereby generating the input feature map that may consider the features related to the distance and angle of the LiDAR sensor data.

In addition, there is an advantage in that the computing apparatus 100 may previously generate the second feature map related to the distance and the second feature map related to the angle for an object detection area according to the above method (e.g., FIGS. 6 and 7), and may efficiently generate the input feature map by commonly combining the same second feature map with the plurality of first feature maps generated by processing the LiDAR sensor data collected later in a preset period or in real time.

The method of generating an input feature map of an artificial intelligence model to detect an object based on LiDAR as described above is described with reference to the flowchart illustrated in the drawings. For a simple description, the method of generating an input feature map of an artificial intelligence model to detect an object based on LiDAR has been described by being illustrated as a series of blocks, but the present disclosure is not limited to the order of the blocks, and some blocks may be performed in an order different from those illustrated and described herein or may be performed concurrently. In addition, new blocks not described in the present specification and drawings may be added, or some blocks may be deleted or changed.

According to various embodiments of the present disclosure, it is possible to channel-combine a feature map for a distance and angle generated and stored by pre-computing a distance and angle for a preset object detection area around an autonomous driving vehicle with a feature map generated using a LiDAR sensor in the form of a three-dimensional point cloud collected in real time to generate an input feature map of an artificial intelligence model to detect an object based on LiDAR, that is, more rapidly generate an input feature map using a feature map previously generated through pre-computation, thereby deriving an accurate result value as well as performing rapid training and inference computation of the artificial intelligence model.

Effects of the present disclosure are not limited to the above-described effects, and other effects that are not described will be clearly understood by those skilled in the art from the above detailed description.

Although embodiments of the present disclosure have been described with reference to the accompanying drawings, those skilled in the art will appreciate that various modifications and alterations may be made without departing from the spirit or essential feature of the present disclosure. Therefore, it should be understood that the above-mentioned embodiments are not restrictive but are exemplary in all aspects.

What is claimed is:

1. A method of generating an input feature map of an artificial intelligence model to detect an object based on light detection and ranging (LiDAR), which is performed by a computing apparatus, the method comprising:

collecting LiDAR sensor data in a form of a three-dimensional point cloud from an autonomous driving vehicle located within a predetermined area of the computing apparatus;

generating one or more first feature maps by processing the collected LiDAR sensor data based on one or more predefined indicators;

generating the input feature map of the artificial intelligence model by combining, as an independent channel, each of the one or more generated first feature maps with one of second feature maps previously generated by pre-computing a distance and an angle for a preset object detection area;

detecting objects around the autonomous vehicle by inputting the input feature map into the artificial intelligence model, and controlling the driving of the autonomous driving vehicle based on the detected the objects;

generating a plurality of grids having a predetermined size by dividing a preset object detection area based on an XY plane;

generating a second feature map related to a distance based on distances between the plurality of generated grids and a reference point; and generating a second feature map related to an angle based on angles between the plurality of generated grids and the reference point, wherein the generating of the second feature map related to the distance includes:

calculating a distance value between center point coordinates of each of the plurality of generated grids and reference point coordinates;

standardizing the calculated distance value using a preset maximum distance value, which is a preset value corresponding to a maximum detection range of a LiDAR sensor; and generating the second feature map related to the distance by inputting the standardized distance value into a matrix corresponding to the preset object detection area, and wherein the generating of the second feature map related to the angle includes:

calculating an angle value between a line connecting the center point of each of the plurality of generated grids and the reference point and an X axis or a Y axis;

transforming the calculated angle value using Euler angle transformation; and generating the second feature map related to the angle by inputting the transformed angle value into the matrix corresponding to the preset object detection area.

2. The method of claim 1, wherein the generating of the one or more first feature maps includes:
generating a plurality of grid pillars by dividing the collected LiDAR sensor data based on an XY plane;
calculating the one or more predefined indicators for each of the plurality of generated grid pillars; and
generating the one or more first feature maps by inputting the one or more calculated indicators into a matrix corresponding to the collected LiDAR sensor data.

3. The method of claim 2, wherein the one or more predefined indicators includes the number, maximum heights, which are heights of points having a largest Z-axis coordinate value, among LiDAR sensor points, minimum heights, which are heights of points having a smallest Z-axis coordinate value, among the LiDAR sensor points, and an average height, which is a mean value of Z-axis coordinate values of the LiDAR sensor points, and
the generating of the one or more first feature maps includes generating, as the independent channel, a first feature map corresponding to each of the number, maximum heights, minimum heights, and average height of the LiDAR sensor points.

4. The method of claim 1, wherein the generating of the second feature map related to the distance includes:
calculating a distance value between the center point coordinates of each of the plurality of generated grids and the reference point coordinates;
transforming the calculated distance value using a predefined logarithmic function; and
generating the second feature map related to the distance by inputting the transformed distance value into the matrix corresponding to the preset object detection area.

5. The method of claim 1, wherein the generating of the second feature map related to the angle includes:
calculating an angle value between a line connecting the center point of each of the plurality of generated grids and the reference point and an X axis or a Y axis;
calculating a trigonometric ratio for the calculated angle value; and
generating two second feature maps related to the angle by inputting the calculated trigonometric ratio into the matrix corresponding to the preset object detection area.

6. An apparatus for generating an input feature map of an artificial intelligence model to detect an object based on light detection and ranging (LiDAR), the apparatus comprising:
a processor;
a network interface;
a memory; and
a computer program loaded into the memory and executed by the processor,
wherein the computer program includes:
an instruction for collecting LiDAR sensor data in a form of a three-dimensional point cloud from an autonomous driving vehicle located within a predetermined area of the apparatus;
an instruction for generating one or more first feature maps by processing the collected LiDAR sensor data based on one or more predefined indicators;
an instruction for generating the input feature map of the artificial intelligence model by combining, as an independent channel, each of the one or more generated first feature maps with one of second feature maps previously generated by pre-computing a distance and an angle for a preset object detection area;
an instruction for detecting objects around the autonomous vehicle by inputting the input feature map into the artificial intelligence model, and controlling the driving of the autonomous driving vehicle based on the detected the objects;
an instruction for generating a plurality of grids having a predetermined size by dividing a preset object detection area based on an XY plane;
an instruction for generating a second feature map related to a distance based on distances between the plurality of generated grids and a reference point; and
an instruction for generating a second feature map related to an angle based on angles between the plurality of generated grids and the reference point,
wherein the instruction for generating of the second feature map related to the distance includes:
an instruction for calculating a distance value between center point coordinates of each of the plurality of generated grids and reference point coordinates;
an instruction for standardizing the calculated distance value using a preset maximum distance value, which is a preset value corresponding to a maximum detection range of a LiDAR sensor; and
an instruction for generating the second feature map related to the distance by inputting the standardized distance value into a matrix corresponding to the preset object detection area, and
wherein the instruction for generating of the second feature map related to the angle includes:
an instruction for calculating an angle value between a line connecting the center point of each of the plurality of generated grids and the reference point and an X axis or a Y axis;
an instruction for transforming the calculated angle value using Euler angle transformation; and
an instruction for generating the second feature map related to the angle by inputting the transformed angle value into the matrix corresponding to the preset object detection area.

7. A non-transitory computer-readable medium having stored therein a computer program for causing a computing apparatus to execute the following operations of:
collecting LiDAR sensor data in a form of a three-dimensional point cloud from an autonomous driving vehicle located within a predetermined area of the computing apparatus;
generating one or more first feature maps by processing the collected LiDAR sensor data based on one or more predefined indicators;
generating an input feature map of an artificial intelligence model by combining, as an independent channel, each of the one or more generated first feature maps with one of second feature maps previously generated by pre-computing a distance and an angle for a preset object detection area;
detecting objects around the autonomous vehicle by inputting the input feature map into the artificial intelligence model, and controlling the driving of the autonomous driving vehicle based on the detected the objects;
generating a plurality of grids having a predetermined size by dividing a preset object detection area based on an XY plane;

generating a second feature map related to a distance based on distances between the plurality of generated grids and a reference point; and
generating a second feature map related to an angle based on angles between the plurality of generated grids and the reference point,
wherein the generating of the second feature map related to the distance includes:
calculating a distance value between center point coordinates of each of the plurality of generated grids and reference point coordinates;
standardizing the calculated distance value using a preset maximum distance value, which is a preset value corresponding to a maximum detection range of a LiDAR sensor; and
generating the second feature map related to the distance by inputting the standardized distance value into a matrix corresponding to the preset object detection area, and
wherein the generating of the second feature map related to the angle includes:
calculating an angle value between a line connecting the center point of each of the plurality of generated grids and the reference point and an X axis or a Y axis;
transforming the calculated angle value using Euler angle transformation; and
generating the second feature map related to the angle by inputting the transformed angle value into the matrix corresponding to the preset object detection area.

* * * * *